Oct. 8, 1929.   T. J. ANDERSON   1,730,714
ROTARY CUTTER HEAD FOR WOODWORKING MACHINES
Filed June 6, 1928   2 Sheets-Sheet 1

Torval J. Anderson INVENTOR.

Oct. 8, 1929. T. J. ANDERSON 1,730,714
ROTARY CUTTER HEAD FOR WOODWORKING MACHINES
Filed June 6, 1928 2 Sheets-Sheet 2
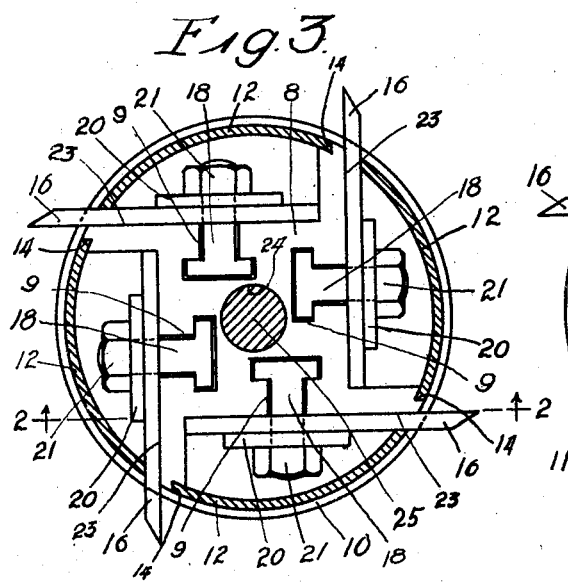
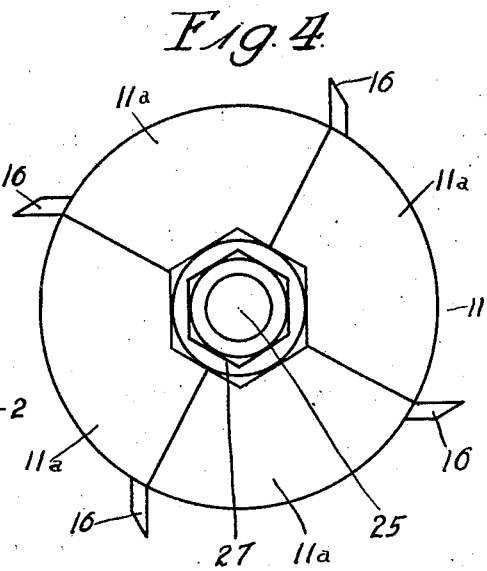
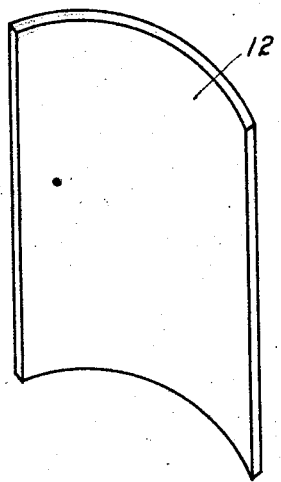
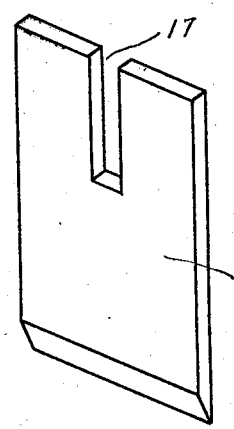
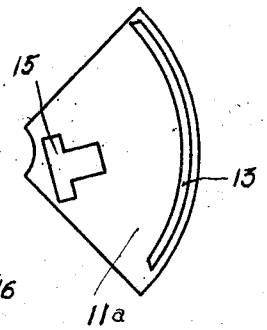
Torval J. Anderson INVENTOR.

Patented Oct. 8, 1929

1,730,714

UNITED STATES PATENT OFFICE

TORVAL J. ANDERSON, OF CHICAGO, ILLINOIS

ROTARY CUTTER HEAD FOR WOODWORKING MACHINES

Application filed June 6, 1928. Serial No. 283,391.

The invention relates more particularly to the cutter heads as used on joiners, planers, shapers, and moulders, and the objects of the invention are:

First, to afford facilities for the proper adjustment of the cutting knives; second, to provide means whereby the arched casings may be removed independently of each other to facilitate the adjustments of the cutting knives even if the cutter head is located in a crowded inconvenient position; third, to provide means for rigidly holding the arched casings in position in the cutter head independently of the means that hold the cutting knives in position; fourth, to provide a round cutter head in which the cutting knives can be adjusted independently of each other to various positions and to different angles edgewise to the length of the head; fifth, to provide in combination with a rotary cutter head arched casings, which are held in position by a collar at one end of the cutter head and by a segmental collar at the opposite end to prevent parts within said head that may accidentally break or become loose from falling out when operating at a high speed; sixth, it is also very important to provide (particularly for moulders) a rotary cutter head in which arched casings are provided in combination with a cutter carrying block to form a round cutter head without projections or indentations on its periphery, other than the knives and the slots, to obtain smoother operation and to eliminate machine marks on the mouldings, which are usually caused by the use of open cutter heads.

Figure 1:
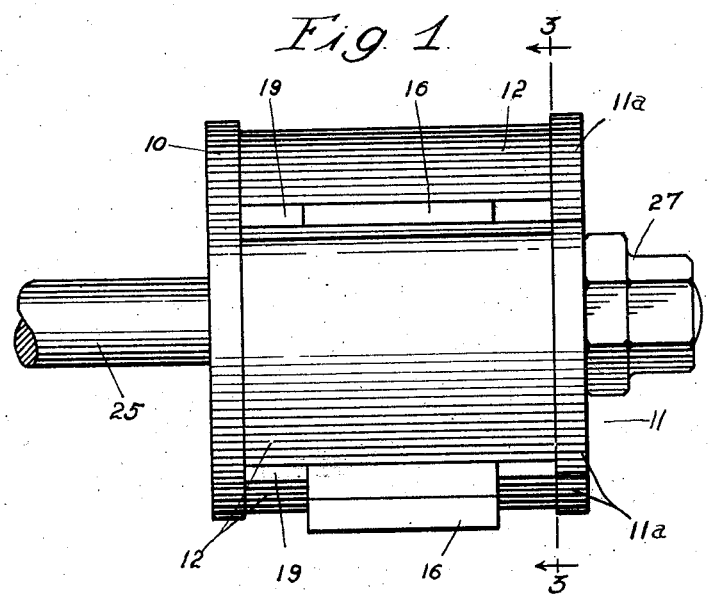
Figure 2:
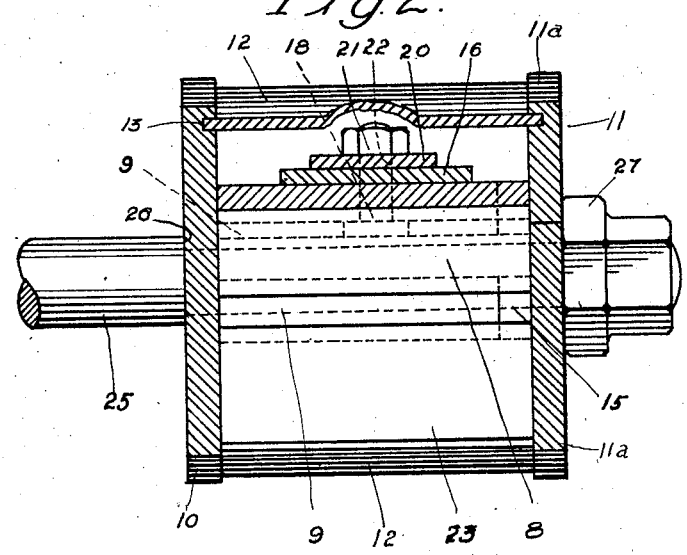

One form of the invention is illustrated in the accompanying drawing, in which, Figure 1 is a side elevation of the cutter head; Figure 2 is a sectional elevation of Figure 1 on line 2—2, Figure 3; Figure 3 is a sectional elevation on line 3—3, Figure 1; Figure 4 is a top view of the cutter head; Figure 5 is a perspective view of one of the arched casings; Figure 6 is a perspective view of one of the cutting knives; and Figure 7 is a view of a segment of the collar.

Referring to the drawings illustrated in Figures 1—2—3—4—5—6—7 the device comprises a cutter carrying block 8 provided with slots 9 and extended portions 23. The collar 10 at one end of said block and the segments 11a of the collar 11 at the opposite end are provided with recesses 13 in which the ends of arched casings 12 register. The extended portions 23 of the cutter carrying block 8 are provided with grooves 14 adapted to receive one edge of the arched casings 12. The other edge of the said casings abuts against the cutting knives 16.

The collar 11 is composed of segments 11a to permit one or more of the arched casings 12 to be removed as may be necessary in order to secure the proper adjustment of the cutting knives 16. The segments 11a are provided with a shoe or lug 15 adapted to register snugly in the slots 9 in the cutter carrying block 8 to hold said segments in position.

The bolts 18 mounted in the slots 9 in the cutter carrying block and through the slots 17 in the knives 16 are threaded at one end to receive a nut 21 for tightly holding the knives in position. The caps 20 are positioned between the knives 16 and the nuts 21.

The cutter carrying block 8 and the collars 10 and 11 are provided with suitable openings 24 to receive one end of the shaft 25. Said shaft 25 is provided with a shoulder 26 against which the collar 10 abuts. The nut 27 screwed on the end of the said shaft binds the component parts of the head substantially together.

What I claim as my invention and desire to secure by Letters Patent is:

1. In a rotary cutter head for wood working machines, a cutter carrying block provided with longitudinal slots, a collar at one end of said block and a segmental collar slidably mounted in said slots at the opposite end, cutting knives mounted on said block, means slidably mounted in said slots to hold said knives in position, opposed grooves in said collars, and arched casings mounted in said grooves forming a cylindrical head with open slots for said knives.

2. In a rotary cutter head for woodworking machines, arched casings, said casings held in position by a collar at one end of said head and by segments of a collar at the opposite end, said collar and segments provided with recesses in which said casings are mounted, and means for tightly clamping said casings in said head.

3. In a rotary cutter head for woodworking machines adapted to be mounted on a shaft, the combination of arched casings, said casings held in position by a collar at one end of said head and by segments of a collar at the opposite end, cutting knives mounted in said head, and means for tightly clamping said casings in said head and said head to said shaft.

4. In a rotary cutter head for woodworking machines, a cutter carrying block provided with longitudinal slots, a collar at one end of said block and segments of a collar at the opposite end, said collars and segments provided with recesses, arched casings mounted in said recesses, and lugs on said segments adapted to register in said slots to hold said segments in position.

5. In a rotary cutter head for woodworking machines, the combination of arched casings and a collar at one end of said head and segments of a collar at the opposite end, said collar and segments provided with recesses in which said casings are adapted to register.

In witness whereof, I have hereunto subscribed my name to this specification.

TORVAL J. ANDERSON.